United States Patent
Hardjono

(10) Patent No.: US 7,360,084 B1
(45) Date of Patent: Apr. 15, 2008

(54) SYSTEM, DEVICE, AND METHOD FOR CONTROLLING ACCESS IN A MULTICAST COMMUNICATION NETWORK

(75) Inventor: Thomas P. Hardjono, Winchester, MA (US)

(73) Assignee: Nortel Networks Limited (CA)

( * ) Notice: Subject to any disclaimer, the term of this patent is extended or adjusted under 35 U.S.C. 154(b) by 1074 days.

(21) Appl. No.: 09/660,370

(22) Filed: Sep. 12, 2000

Related U.S. Application Data

(60) Provisional application No. 60/204,218, filed on May 15, 2000.

(51) Int. Cl.
*H04L 29/00* (2006.01)

(52) U.S. Cl. ............... 713/163; 713/150; 713/151; 713/153; 713/168; 713/162; 380/42; 709/238

(58) Field of Classification Search .............. 713/201, 713/168, 150, 151, 153, 163, 162, 156–157; 380/42, 278–27, 30; 709/238
See application file for complete search history.

(56) References Cited

U.S. PATENT DOCUMENTS

| | | | |
|---|---|---|---|
| 5,748,736 A * | 5/1998 | Mittra | 713/163 |
| 6,026,167 A * | 2/2000 | Aziz | 380/28 |
| 6,058,416 A * | 5/2000 | Mukherjee et al. | 709/203 |
| 6,097,720 A | 8/2000 | Araujo et al. | |
| 6,154,463 A | 11/2000 | Aggarwal et al. | |
| 6,185,678 B1 * | 2/2001 | Arbaugh et al. | 713/2 |
| 6,295,361 B1 * | 9/2001 | Kadansky et al. | 380/278 |
| 6,363,154 B1 * | 3/2002 | Peyravian et al. | 380/283 |
| 6,415,323 B1 * | 7/2002 | McCanne et al. | 709/225 |
| 6,606,706 B1 * | 8/2003 | Li | 713/162 |
| 6,664,922 B1 * | 12/2003 | Fan | 342/357.1 |
| 6,684,331 B1 * | 1/2004 | Srivastava | 713/163 |
| 6,718,387 B1 * | 4/2004 | Gupta et al. | 709/226 |

OTHER PUBLICATIONS

Ballardie A. "Scalable Multicast Key Distribution", May 1996, University of London, pp. 1-18.*
Haller et al. "On Internet Authentication", Oct. 1994, Network Working Group, pp. 1-17.*
Harney et al. "Group Key Management Protocol (GKMP) Specification", Jul. 1997, Network Working Group, pp. 1-23.*
Gong et al. "Elements of Trusted Multicasting", 1994, IEEE, SRI Computer Scient Laboratory, pp. 23-29.*

(Continued)

*Primary Examiner*—Kambiz Zand
*Assistant Examiner*—Tongoc Tran
(74) *Attorney, Agent, or Firm*—Anderson Gorecki & Manaras LLP

(57) ABSTRACT

A system, device, and method for controlling access in a multicast communication network uses a centralized host authentication scheme to prevent unauthorized hosts from joining a shared multicast distribution tree. Each authorized host is allocated a unique authentication key, which is used by the designated router to encode the PIM join message and by the rendezvous point router to authenticate the PIM join message. If the PIM join message is authentic, then each PIM router from the rendezvous point router to the designated router establishes appropriate multicast routes to route multicast packets to the host. If the PIM join message is not authentic, then multicast packets are prevented from reaching the host.

43 Claims, 9 Drawing Sheets

OTHER PUBLICATIONS

Mittra S. "Iolus: A Framework for Scalable Secure Multicasting", 1997, Computer Science Department, Stanford Univerisit, pp. 277-288.*

Ishikawa et al. "An Architecture for User Authentication of IP Multicast and Its Implementation", 1999, IEEE, pp. 81-87.*

Bird et al., "The KryptoKnight Family of Light-Weight Protocols for Authentication and Key Distribution", IEEE/ACM Transactions on Networking, vol. 3, No. 1, Feb. 1995., pp. 32-33.*

Briscoe et al., "Nark, Receiver-Based Multicast Non-Repudiation and Key Management", Proceedings of the 1st ACM Conference on Electronic Commerce, 1999.*

Kaur, S. et al. "Multicast support for mobile IP using a modified IGMP", Sep. 1999, IEEE, vol. 2, pp. 948-952.

Liao, Wanjiun et al, "Receiver-initiated Group Membership Protocol (RGMP: a New Group Management Protocol for IP Multicasting", Oct. 1999, IEEE, pp. 51-58.

Ansari, F. et al, "IP Switching: Over Fast ATM Cell Transport (IPSOFACTO): IP Multicast over Wireless ATM", Oct. 1998, IEE, vol. 1, pp. 621-626.

Ballardie, Tony et al., "Multi-Specific Security Threats and Conter-Measures" il 1995, IEE, pp. 2-16.

Fenner, "Internet Group Management Protocol, Version 2" Internet Engineering Task Force Request for Comments: 2236, Nov. 1997.

Cain et al., "Internet Group Management Protocol, Version 3" Internet Engineering Task Force Internet Draft-ietf-idmr-igmp-v3-04.txt, Jun. 2000.

* cited by examiner

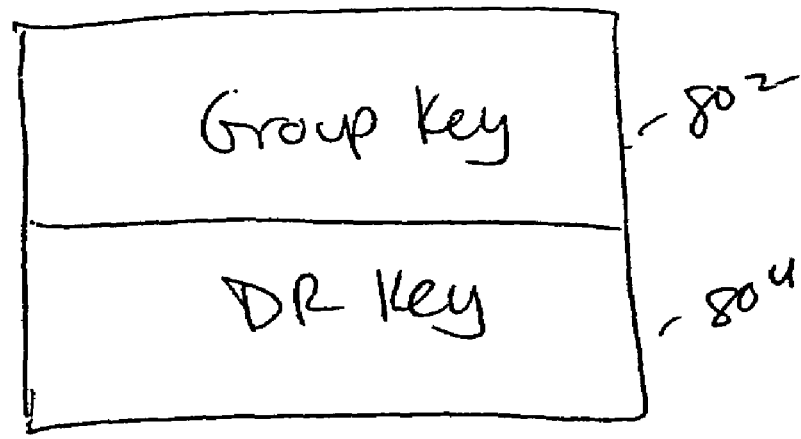
FIG. 8    800
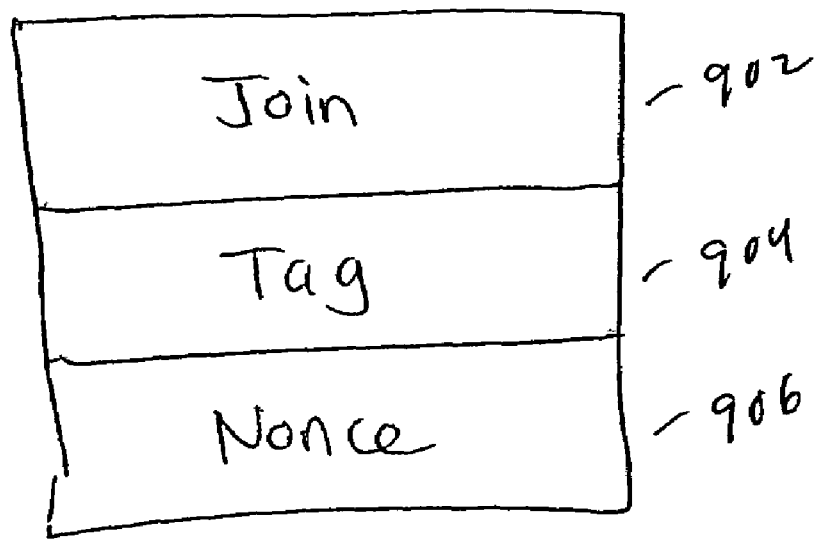
FIG. 9    900

SYSTEM, DEVICE, AND METHOD FOR CONTROLLING ACCESS IN A MULTICAST COMMUNICATION NETWORK

PRIORITY

The present patent application claims priority from the commonly-owned U.S. Provisional Patent Application No. 60/204,218 entitled SYSTEM, DEVICE, AND METHOD FOR CONTROLLING ACCESS IN A MULTICAST COMMUNICATION NETWORK, which was filed on May 15, 2000 in the name of Thomas P. Hardjono, and is hereby incorporated herein by reference in its entirety.

FIELD OF THE INVENTION

The present invention relates generally to communication systems, and more particularly to controlling access to a shared multicast distribution tree in a Protocol Independent Multicast (PIM) communication network.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree (referred to hereinafter as the "shared tree"), and is maintained by each router in one or more routing tables (often referred to as a "routing information base").

One problem that plagues many multicast communication networks is security, or more specifically, the lack thereof. Many multicast communication networks are based upon an anonymous receiver model in which any host can join the shared tree, for example, using a group management mechanism such as the Internet Group Management Protocol (IGMP) as described in Fenner, Internet Engineering Task Force (IETF) Request for Comments (RFC) 2236, *Internet Group Management Protocol, Version 2* (November 1997), which is hereby incorporated herein by reference in its entirety. This anonymous receiver model exposes the shared tree to various types of attacks.

One attempt to protect the shared tree involves the use of data encryption to prevent unauthorized hosts from accessing multicast data. For data encryption, a group-wide encryption key (referred to hereinafter as the "group key") is used to encrypt and decrypt all multicast data for a particular multicast group. The group key is distributed to the multicast source as well as to all authorized multicast clients (hosts). The multicast source uses the group key to encrypt the multicast data, while all authorized multicast clients use the group key to decrypt the multicast data. Unauthorized hosts that receive the encrypted multicast data are unable to decrypt the multicast data, and are therefore prevented from accessing the multicast data.

Another attempt to protect the shared tree involves the authentication of control messages between multicast routers. Specifically, the multicast routers exchange various control messages for, among other things, joining the shared tree. These control messages are authenticated hop-by-hop according to a predetermined authentication scheme. By authenticating all control messages, only authorized multicast routers are able to join the shared tree.

Unfortunately, neither data encryption nor control message authentication prevents an unauthorized host from joining the shared tree and thereby consuming valuable communication resources. Because authentication operates only between the multicast routers, an unauthorized host can still join the shared tree, specifically by sending a join request, for example, using IGMP or other group management mechanism. The multicast routers establish the appropriate multicast routes for routing multicast packets to the unauthorized host, perhaps even using authentication to perform hop-by-hop authentication. As a member of the shared tree, the unauthorized host receives multicast packets. This is true even if the multicast packets are protected using data encryption, in which case the unauthorized host simply discards the encrypted multicast data.

Thus, a technique for controlling access in a multicast communication network is needed.

SUMMARY OF THE INVENTION

An unauthorized host device is prevented from joining the PIM shared tree using a centralized host authentication mechanism. Each authorized host is allocated a unique authentication key, which is used by the designated router to encode the PIM join message and by the rendezvous point router to authenticate the PIM join message. If the PIM join message is authentic, then each PIM router from the rendezvous point router to the designated router establishes appropriate multicast routes to route multicast packets to the host. If the PIM join message is not authentic, then multicast packets are prevented from reaching the host. Otherwise, the host device is added to the shared tree and receives multicast packets forwarded by the rendezvous point router.

BRIEF DESCRIPTION OF THE DRAWINGS

The foregoing and other objects and advantages of the invention will be appreciated more fully from the following further description thereof with reference to the accompanying drawings wherein:

FIG. 8 is a communication message diagram showing the relevant fields of an exemplary GKM protocol message in accordance with an embodiment of the present invention;

FIG. 9 is a communication message diagram showing the relevant fields of an exemplary tagged PIM join message in accordance with an embodiment of the present invention;

DETAILED DESCRIPTION OF A PREFERRED EMBODIMENT

Figure 1:
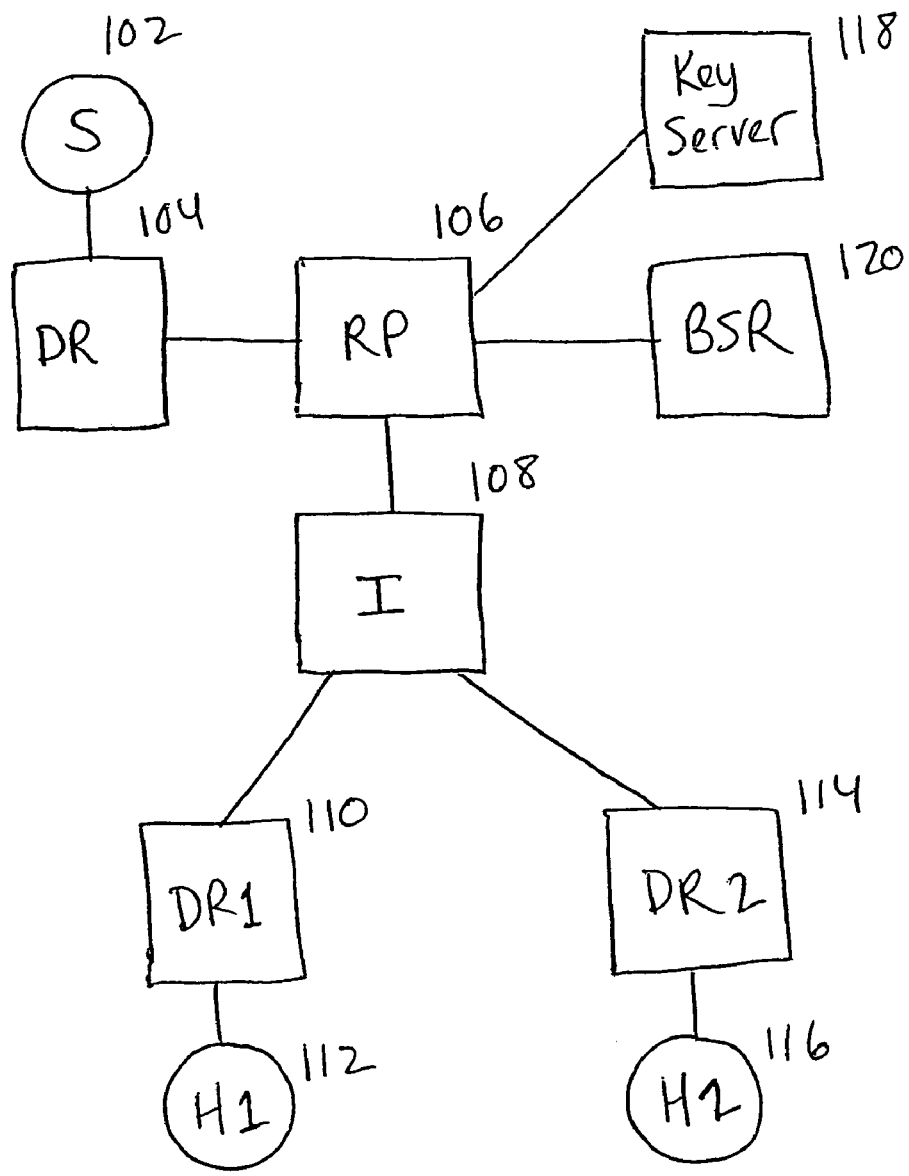
FIG. 1 is a network diagram showing an exemplary PIM communication network in accordance with an embodiment of the present invention.

An embodiment of the present invention uses a centralized host authentication scheme to prevent unauthorized hosts from joining the shared tree. This centralized host authentication scheme is in addition to data encryption and control message authentication.

In the centralized host authentication scheme of an embodiment of the present invention, host authentication is performed by a central device when the host attempts to join the shared tree. Specifically, an authorized host obtains an authentication key, for example, from a key server. The authentication key is also sent to the central device, for example, by the key server, and to an access device through which the host accesses the shared tree, for example, by the host within an IGMP join request. In any case, upon receiving an IGMP join request from the host, the access device generates an encoded join request using the authentication key for the host, and forwards the encoded join request upstream toward the central device. Upon receiving the encoded join request, the central device authenticates the encoded join request using the authentication key for the host. If the encoded join message is authentic, then each intermediate device from the central device to the access device establishes appropriate multicast routes to route multicast packets to the host. If the encoded join message is not authentic, then multicast packets are prevented from reaching the host.

Various aspects of the present invention are described herein with reference to a Protocol Independent Multicast (PIM) communication network. PIM is a well-known protocol for routing multicast packets within a multicast routing domain. PIM is so named because it is not dependent upon any particular unicast routing protocol for setting up a multicast distribution tree within the multicast routing domain. PIM has two modes of operation, specifically a sparse mode and a dense mode. PIM Sparse Mode (PIM-SM) is described in Estrin et al., Internet Engineering Task Force (IETF) Request For Comments (RFC) 2362, *Protocol Independent Multicast—Sparse Mode (PIM-SM): Protocol Specification* (June 1998), which is hereby incorporated herein by reference in its entirety. PIM Dense Mode (PIM-DM) is described in Deering et al., Internet Engineering Task Force (IETF) Internet Draft draft-ietf-pim-v2-dm-03.txt, *Protocol Independent Multicast Version 2 Dense Mode Specification* (Jun. 7, 1999), which is hereby incorporated herein by reference in its entirety.

In accordance with the PIM protocol, the various routers within a particular PIM domain establish a default multicast distribution tree, referred to as a "shared tree," for each multicast group. Each shared tree is rooted at a Rendezvous Point (RP) router (i.e., the central device) that acts as the distribution point of all multicast packets for the multicast group. Before a router can join the shared tree for a particular multicast group, the router must learn the identity of the multicast group RP router. A router learns the identity of the multicast group RP router by receiving a PIM Bootstrap Message including a list of all RP routers in the PIM domain. The router receives the PIM Bootstrap Message either from a Bootstrap Router (BSR), which sends the PIM Bootstrap Message to all routers in the PIM domain at predetermined intervals (typically every 60 seconds), or from a neighboring router, which sends the PIM Bootstrap Message to the router if and only if the neighboring router has lost contact with the router for a predetermined period of time (typically 105 seconds). Upon learning the identity of the multicast group RP router, or at any time thereafter, each router that supports a downstream multicast group member (i.e., multicast client) joins the shared tree by sending a PIM Join/Prune Message hop-by-hop toward the multicast group RP router. Each intermediate router that receives the PIM Join/Prune Message from a downstream router also joins the shared tree by forwarding the PIM Join/Prune Message toward the multicast group RP router.

Typically, a PIM router joins the shared tree when a downstream multicast client joins the shared tree. Specifically, each host accesses the shared tree through a PIM router that is referred to as the Designated Router (DR) for that host (i.e., the access device). The host and the DR support a multicast group management protocol, such as IGMP. In order to join the shared tree, the host sends a join request to the DR using the multicast group management protocol, and the DR forwards a PIM join message upstream towards the RP. Each PIM router that receives the PIM join message establishes the appropriate multicast routes for routing multicast packets to the host, and also joins the shared tree (if it is not already joined to the shared tree) by forwarding the PIM join message upstream towards the RP.

Data encryption may be used to prevent unauthorized hosts from accessing multicast data. For data encryption, a group-wide encryption key (referred to hereinafter as the "group key") is used to encrypt and decrypt all multicast data for a particular multicast group. The group key is distributed to the multicast source as well as to all authorized multicast clients (hosts). The multicast source uses the group key to encrypt the multicast data, while all authorized multicast clients use the group key to decrypt the multicast data. Unauthorized hosts that receive the encrypted multicast data are unable to decrypt the multicast data, and are therefore prevented from accessing the multicast data.

Authentication may be used to prevent unauthorized routers from joining the PIM shared tree. For PIM authentication, all PIM control messages are authenticated hop-by-hop from the DR to the RP, as described in Wei, Internet Engineering Task Force (IETF) Internet Draft draft-ietf-pim-v2-auth-00.txt, *Authenticating PIM Version 2 Messages* (Nov. 11, 1998), which is hereby incorporated herein by reference in its entirety. PIM authentication is performed using IPsec AH and a symmetric encryption key that is shared by all routers in the PIM domain (referred to hereinafter as the "equal-opportunity key"), as described in Kent et al., Internet Engineering Task Force (IETF) Request for Comments (RFC) 2401, *Security Architecture for the Internet Protocol* (November 1998), which is hereby incorporated herein by reference in its entirety. By authenticating all PIM control messages, only authorized PIM routers are able to join the shared tree.

FIG. 1 shows an exemplary PIM communication network 100. The exemplary PIM communication network 100 includes key server (118), BSR (120), RP (106), intermediate PIM router (108), multicast source S (102), two multicast hosts H1 (112) and H2 (116), and three designated routers DR (104), DR1 (110), and DR2 (114). The multicast source S (102) accesses the shared tree via DR (104). The multicast host H1 (112) accesses the shared tree via DR1 (110). The multicast host H2 (116) accesses the shared tree via DR2 (114). The three designated routers DR (104), DR1 (110), and DR2 (114) are coupled through RP (106) and the intermediate PIM router (108).

In an exemplary embodiment of the present invention, an authorized host is allocated a unique authentication key (referred to hereinafter as the "DR key"). The DR key is distributed to the DR, for example, by the host within an IGMP join request. The DR key is used by the DR to encode a corresponding PIM join message and by the RP to authenticate the PIM join message. If the PIM join message is authentic, then each PIM router from the RP to the DR establishes appropriate multicast routes to route multicast packets to the host. If the PIM join message is not authentic, then multicast packets are prevented from reaching the host.

The DR key is distributed to the host using a key distribution protocol that is typically scalable, secure, and independent of the underlying unicast and multicast routing protocols. Because the host already uses a group key management (GKM) protocol to obtain a group key for data encryption from a secure key server, it is preferable for the host to also use the GKM protocol to obtain the DR key from the key server. Specifically, the host uses the GKM protocol to request the group key from the key server. Upon receiving the request from the host using the GKM protocol, the key server authenticates the host and, assuming the host is authorized to receive the group key, generates a unique DR key for the host and sends both the group key and the DR key to the host using the GKM protocol.

Figure 2:
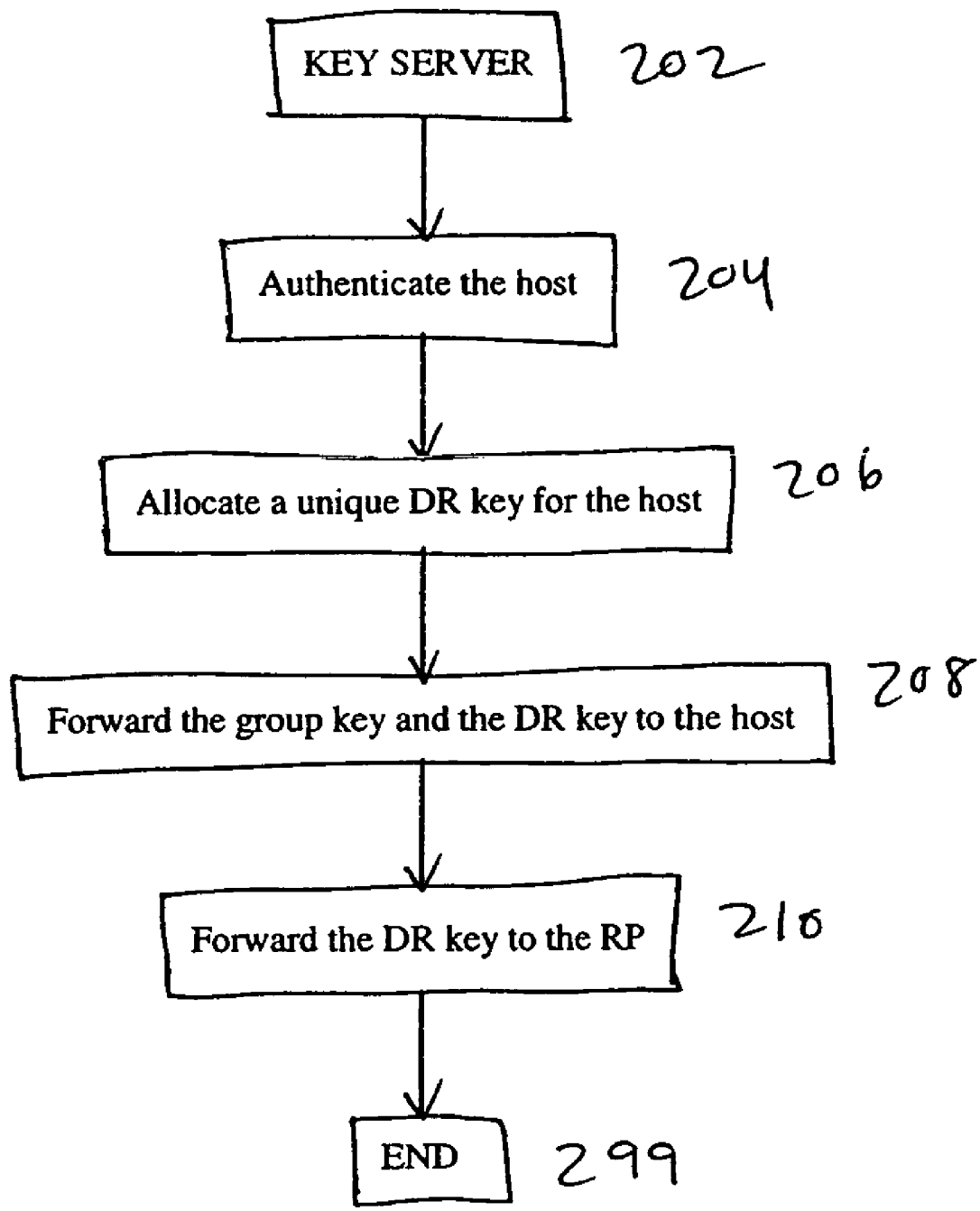
FIG. 2 is a logic flow diagram showing exemplary key server logic in accordance with an embodiment of the present invention.

FIG. 2 shows exemplary key server logic 200. Beginning at block 202, and upon receiving a request from the host, the logic authenticates the host, in block 204, to determine whether the host is authorized to receive the group key. Assuming the host is authorized to receive the group key, the logic allocates a unique DR key for the host, in block 206. The logic then forwards both the group key and the DR key to the host, in block 208, for example, using the GKM protocol. The logic also forwards the DR key to the RP, in block 210. The logic 200 terminates at block 299.

FIG. 8 shows the relevant fields of an exemplary GKM protocol message 800. The GKM protocol message 800 includes, among other things, a group key field 802 and a DR key field 804. The GKM protocol message 800 is sent by the key server 118 to the host as part of the group key management function.

After receiving its DR key from the key server using the GKM protocol, the host sends its DR key to its DR. The host may send the DR key to the DR prior to sending a join request to the DR, although the host preferably includes the DR key in the join request, for example, in an extended IGMP join request that includes a DR key field.

Figure 3:
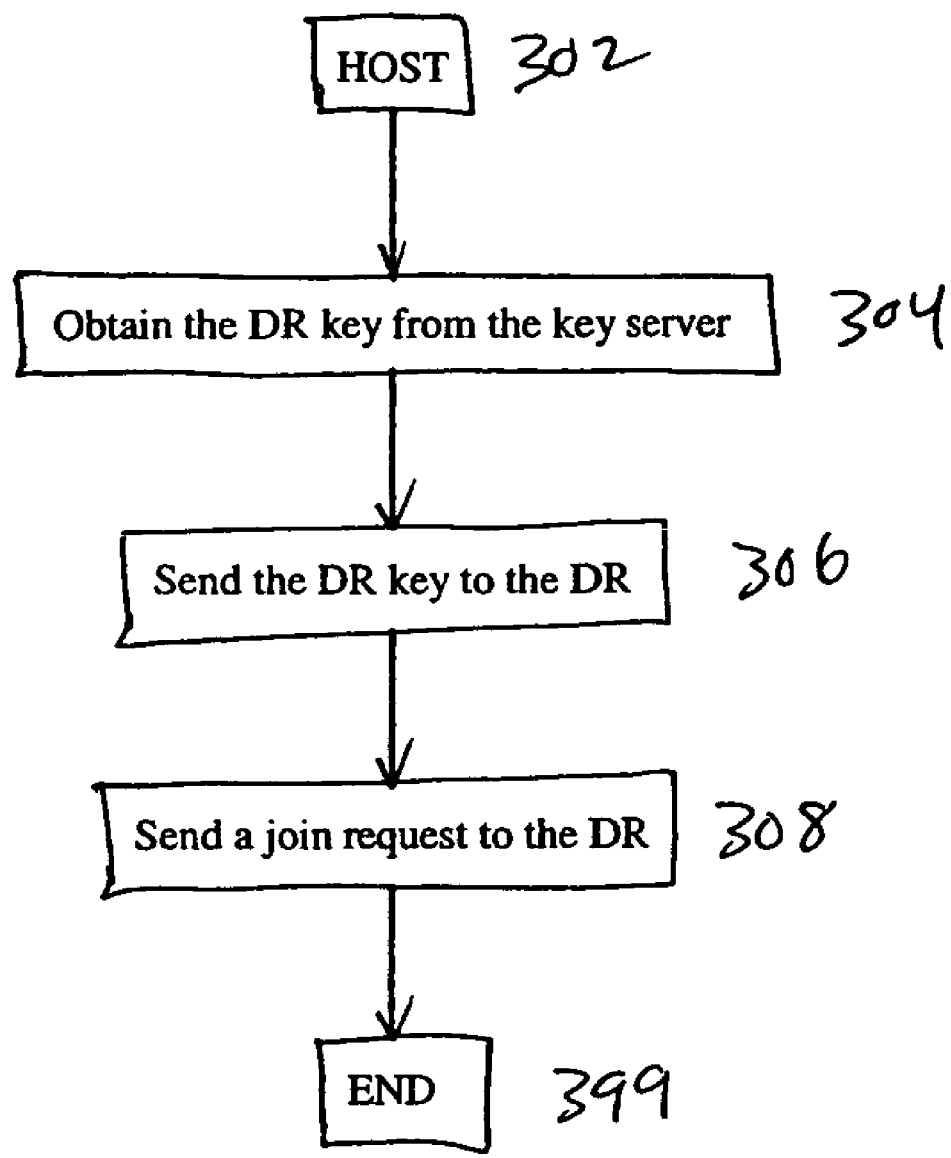
FIG. 3 is a logic flow diagram showing exemplary host logic in accordance with an embodiment of the present invention.

FIG. 3 shows exemplary host logic 300. Beginning at block 302, and upon obtaining the DR key from the key server 118, the logic sends the DR key to the DR 104, in block 306, and sends a join request to the DR 104, in block 308. In a typical embodiment of the invention, the host sends both the DR key and the join request in an extended IGMP join request that includes a DR key field. The logic 300 terminates at block 399.

Figure 11:
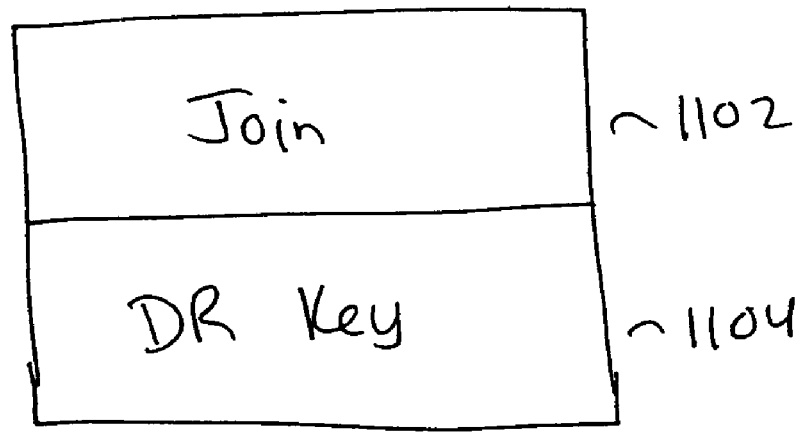
FIG. 11 is a communication message diagram showing the relevant fields of an exemplary extended IGMP join request message in accordance with an embodiment of the present invention.

FIG. 11 shows the relevant fields of an exemplary extended IGMP join request message 1100. The extended IGMP join request message 1100 includes, among other things, a join field 1102 and a DR key field 1104. The extended IGMP join request message 1100 is sent by the host to the DR in order to join the shared tree. The host includes its DR key in the DR field 1104.

In any case, after receiving both the DR key and the join request, the DR generates a specially formatted PIM join message that can be authenticated using the DR key. In an exemplary embodiment of the invention, the specially formatted PIM join message includes, among other things, a (join, tag, nonce) triplet that is treated as a payload to be protected using PIM authentication, and is referred to hereinafter as a "tagged" PIM join message. The tag is preferably a digest/MAC that the DR computes using a keyed hash function and the DR key. The nonce is a number that the DR changes each time it generates a tagged PIM join message, and is used in part to prevent a "playback" attack. The DR forwards the tagged PIM join message (with PIM authentication) upstream toward the RP.

Figure 4:
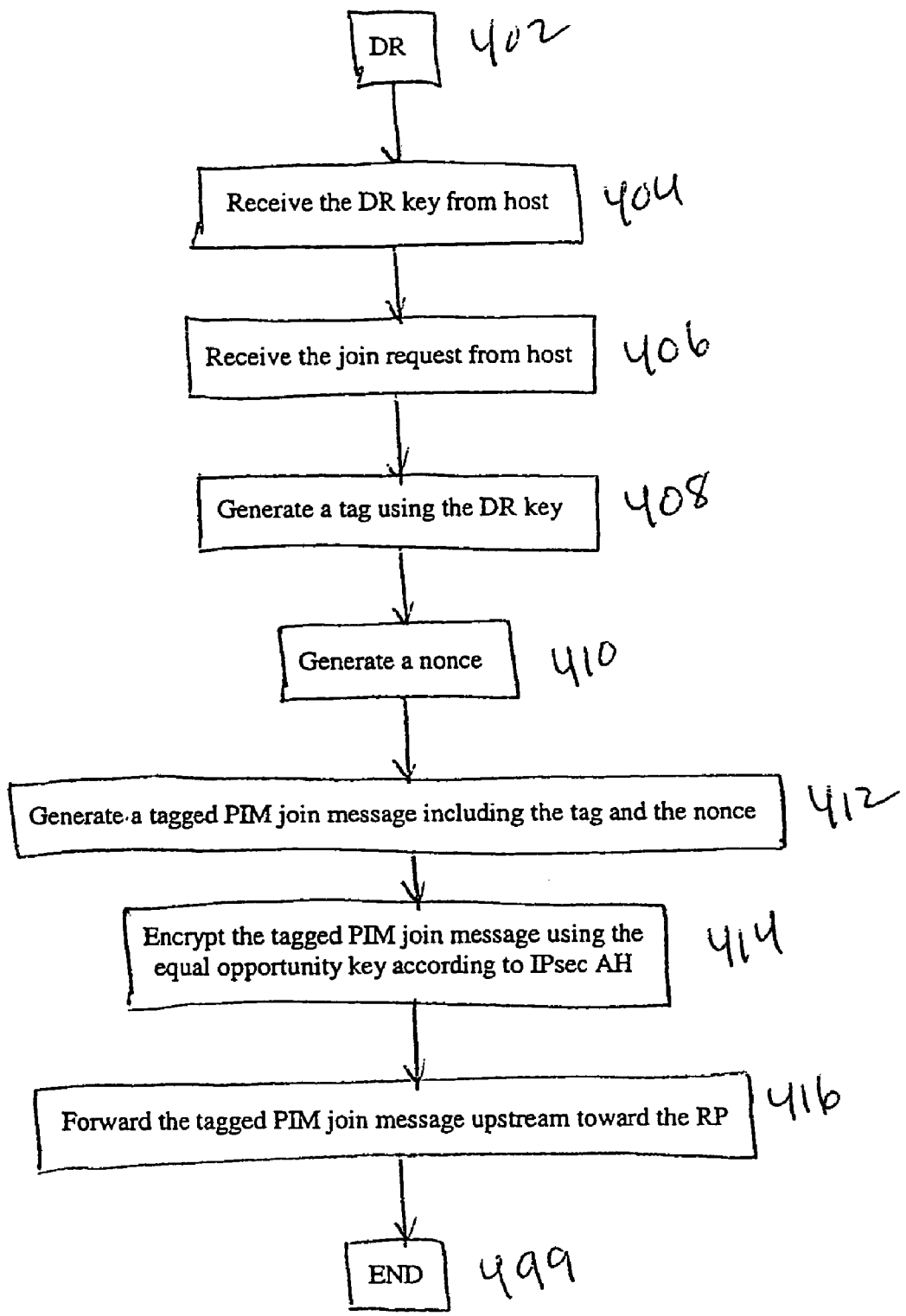
FIG. 4 is a logic flow diagram showing exemplary designated router (DR) logic in accordance with an embodiment of the present invention.

FIG. 4 shows exemplary DR logic 400. Beginning at block 402, and upon receiving the DR key from the host, in block 404, as well as a join request from the host, in block 406, the logic generates a tag using the DR key, in block 408. The logic also generates a nonce, in block 410. The logic generates a tagged PIM join message including, among other things, the tag and the nonce, in block 412. Assuming PIM Authentication is used, the logic encrypts the tagged PIM join message using the equal opportunity key according to IPsec AH, in block 414, and forwards the tagged PIM join message upstream toward the RP 106, in block 416. The logic 400 terminates at block 499.

FIG. 9 shows the relevant fields of an exemplary tagged PIM join message 900. The tagged PIM join message 900 includes, among other things, a join field 902, a tag field 904, and a nonce field 906. The tagged PIM join message is generated by the DR and forwarded by the DR upstream toward the RP 106.

Each intermediate PIM router between the DR and the RP processes the tagged PIM join message and forwards the tagged PIM join message upstream toward the RP. Specifically, after authenticating the tagged PIM join message using the equal opportunity key, the intermediate PIM router determines whether or not it is already joined to the shared tree.

If the intermediate PIM router is not already joined to the shared tree, then the intermediate PIM router is not yet receiving multicast packets. Therefore, the intermediate PIM router establishes multicast routes for forwarding multicast packets to the host, and forwards the tagged PIM join message upstream toward the RP. If the host is authentic, then the intermediate PIM router will receive multicast packets from its upstream neighbor for forwarding to the host. If the host is not authentic, then the intermediate PIM router will not receive multicast packets from its upstream neighbor, and the intermediate PIM router will eventually remove the multicast routes.

However, if the intermediate PIM router is already joined to the shared tree, then the intermediate PIM router is already receiving and forwarding multicast packets, and cannot simply establish multicast routes for forwarding multicast packets to the host. This is because, by establishing such multicast routes, multicast packets would be forwarded to the host even if the host ultimately fails authentication. Therefore, before establishing such multicast routes, the intermediate PIM router forwards the tagged PIM join message upstream toward the RP and waits for an explicit acknowledgment from the RP indicating that the host is authentic. The intermediate PIM router preferably also saves a copy of the tagged PIM join message for correlation to the explicit acknowledgement.

As discussed below with reference to the RP, the intermediate PIM router may or may not receive the explicit acknowledgment (or may receive an explicit negative acknowledgment indicating that the host is not authentic). If the intermediate PIM router receives the explicit acknowledgment from the RP indicating that the host is authentic, then the intermediate PIM router establishes multicast routes for forwarding multicast packets to the host. If the intermediate PIM router does not receive the explicit acknowledgment from the RP indicating that the host is authentic (or receives the explicit negative acknowledgment), then the intermediate PIM router does not establish multicast routes for forwarding multicast packets to the host.

Figure 5:
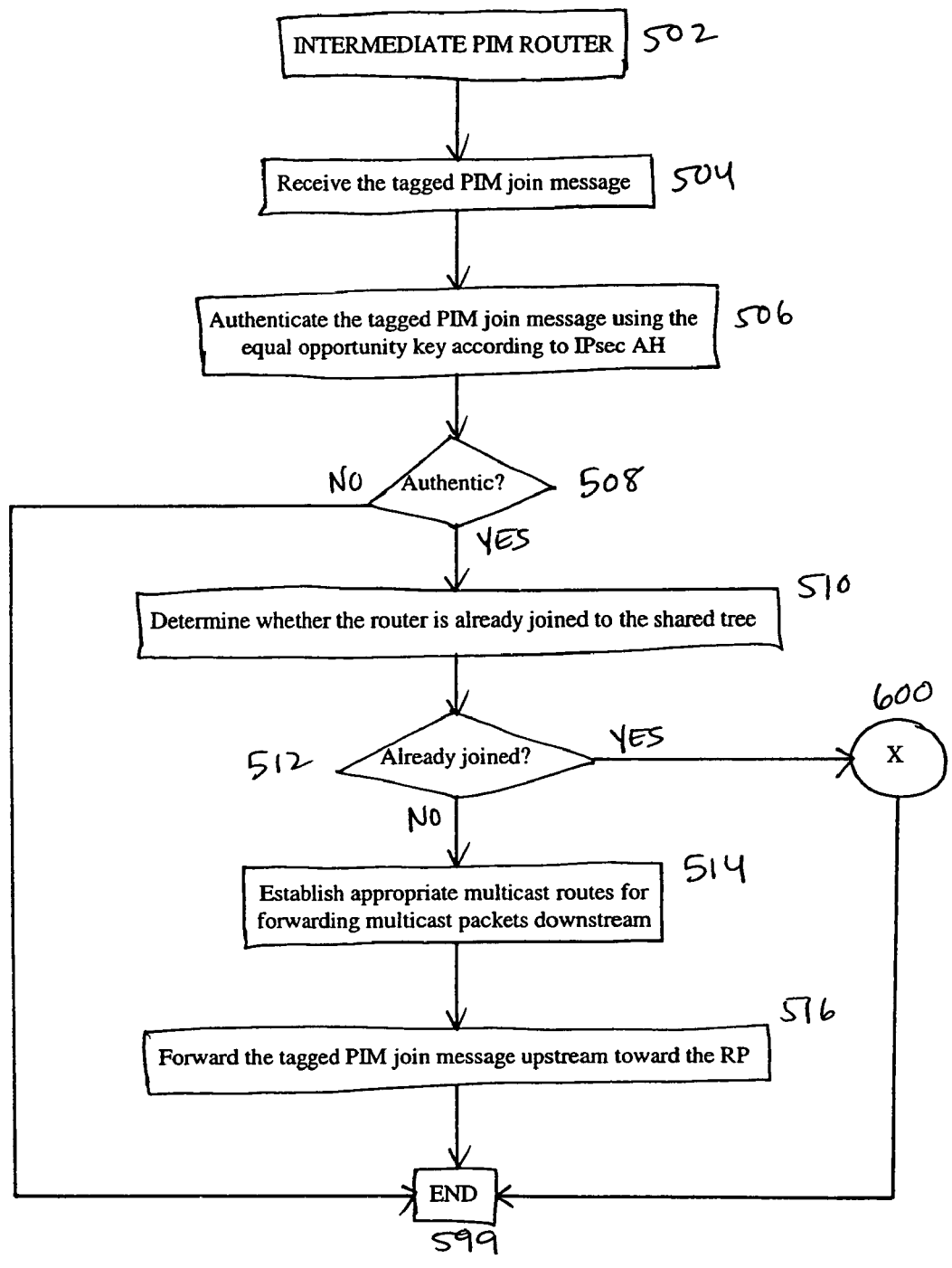
FIG. 5 is a logic flow diagram showing exemplary intermediate PIM router logic in accordance with an embodiment of the present invention in which the intermediate PIM router is not already joined to the shared tree.
Figure 6:
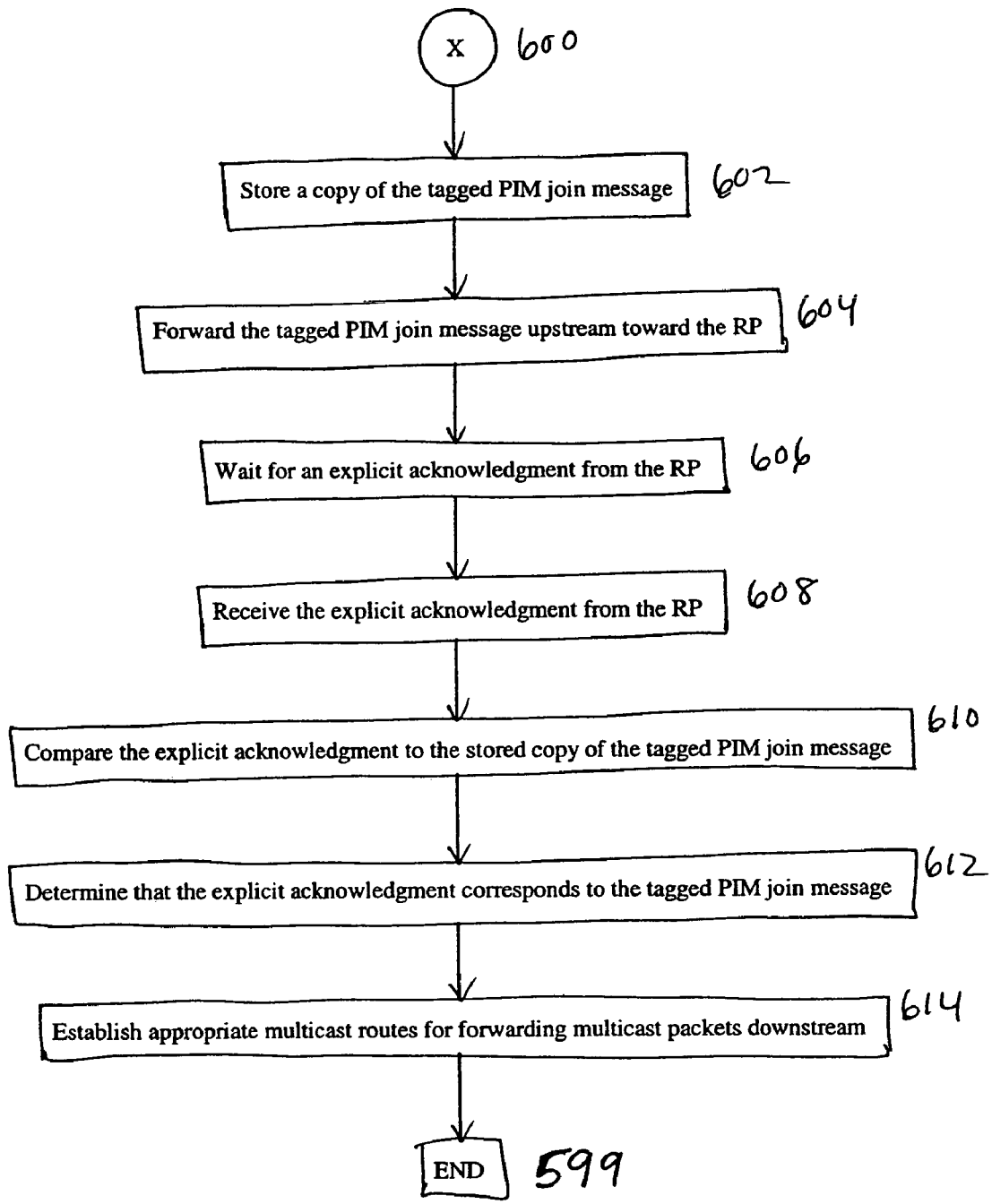
FIG. 6 is a logic flow diagram showing exemplary intermediate PIM router logic in accordance with an embodiment of the present invention in which the intermediate PIM router is already joined to the shared tree.

FIGS. 5 and 6 show exemplary intermediate PIM router logic 500 for processing the tagged PIM join message. Beginning at block 502, and upon receiving the tagged PIM join message, in block 504, the logic authenticates the tagged PIM join message using the equal opportunity key according to IPsec AH, in block 506. If the tagged PIM join message in not authentic (NO in block 508), then the logic 500 terminates at block 599. If the tagged PIM join message is authentic (YES in block 508), then the logic determines whether the router is already joined to the shared tree, in block 510. If the router is not already joined to the shared tree (NO in block 512), then the logic proceeds to block 514. If the router is already joined to the shared tree (YES in block 512), then the logic proceeds to block 600.

At block 514, the logic establishes appropriate multicast routes for forwarding multicast packets downstream toward the host. The logic also forwards the tagged PIM join message upstream toward the RP 106, in block 516. The logic 500 terminates at block 599.

At block 600, as shown in FIG. 6, the logic stores a copy of the tagged PIM join message, in block 602, and forwards the tagged PIM join message upstream toward the RP 106, in block 604. The logic waits for an explicit acknowledgment from the RP 106, in block 606. Upon receiving the explicit acknowledgment from the RP 106, in block 608, the logic compares the explicit acknowledgment to the stored copy of the tagged PIM join message, in block 610, specifically to verify that the explicit acknowledgment corresponds to the tagged PIM join message. Upon determining that the explicit acknowledgment corresponds to the tagged PIM join message, in block 612, the logic establishes appropriate multicast routes for forwarding multicast packets downstream toward the host, in block 614. The logic 500 terminates at block 599.

Eventually, the RP router receives the tagged PIM join message that was generated by the DR and forwarded upstream by the intermediate PIM routers. The RP maintains a list of all DR keys, which it obtains from the key server over a secure communication link. Upon receiving the tagged PIM join message, the RP searches the list of DR keys for the DR key associated with the host, and uses the DR key to authenticate the tagged PIM join message. Specifically, the RP uses the DR key to verify the tag using the keyed hash function. If the RP determines that the tagged PIM join message is authentic, then the RP generates an explicit acknowledgment including both the tag and the nonce and forwards the explicit acknowledgment downstream toward the host. If the RP fails to find the DR 1-5 key associated with the host or the RP determines that the tagged PIM join message is not authentic, then the RP considers the host to be unauthorized, in which case the RP does not generate an explicit acknowledgment (or alternatively generates an explicit negative acknowledgment).

Figure 7:
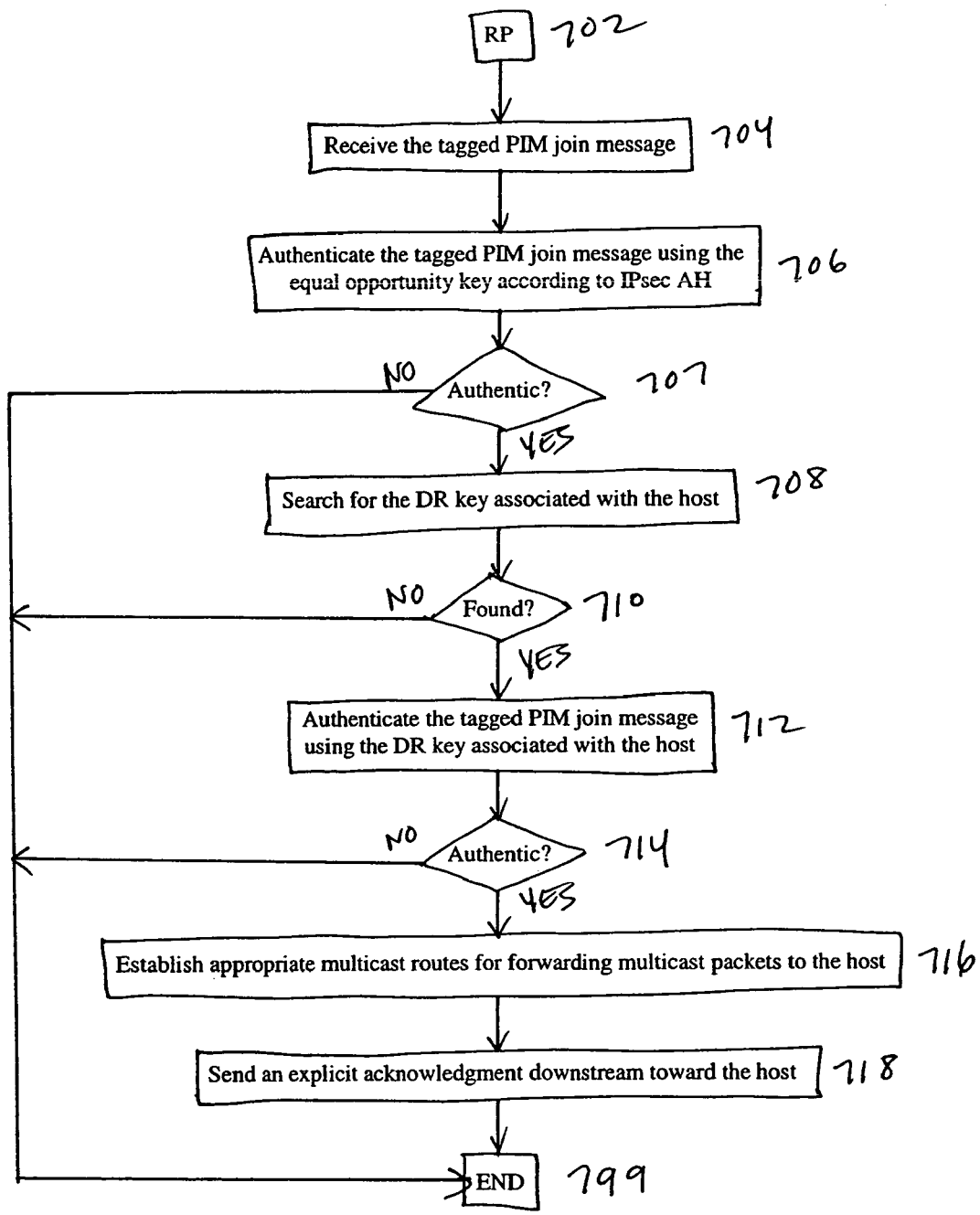
FIG. 7 is a logic flow diagram showing exemplary rendezvous point (RP) logic in accordance with an embodiment of the present invention.

FIG. 7 shows exemplary RP logic 700. Beginning at block 702, and upon receiving the tagged PIM join message, in block 704, the logic authenticates the tagged PIM join message using the equal opportunity key according to IPsec AH, in block 706. If the tagged PIM join message is not authentic (NO in block 707), then the logic 700 terminates at block 799. If the tagged PIM join message is authentic (YES in block 707), then the logic searches for the DR key associated with the host, in block 708, specifically from a list of DR keys maintained by the RP. If the RP fails to find the DR key associated with the host (NO in block 710), then the logic 700 terminates at block 799. If the RP finds the DR key associated with the host (YES in block 710), then the logic authenticates the tagged PIM join message using the DR key associated with the host, in block 712. If the tagged PIM join message is not authentic (NO in block 714), then the logic 700 terminates at block 799. If the tagged PIM join message is authentic (YES in block 714), then the logic establishes appropriate multicast routes for forwarding multicast packets to the host, in block 716, and sends an explicit acknowledgment downstream toward the host, in block 718. The logic 700 terminates at block 799.

Figure 10:
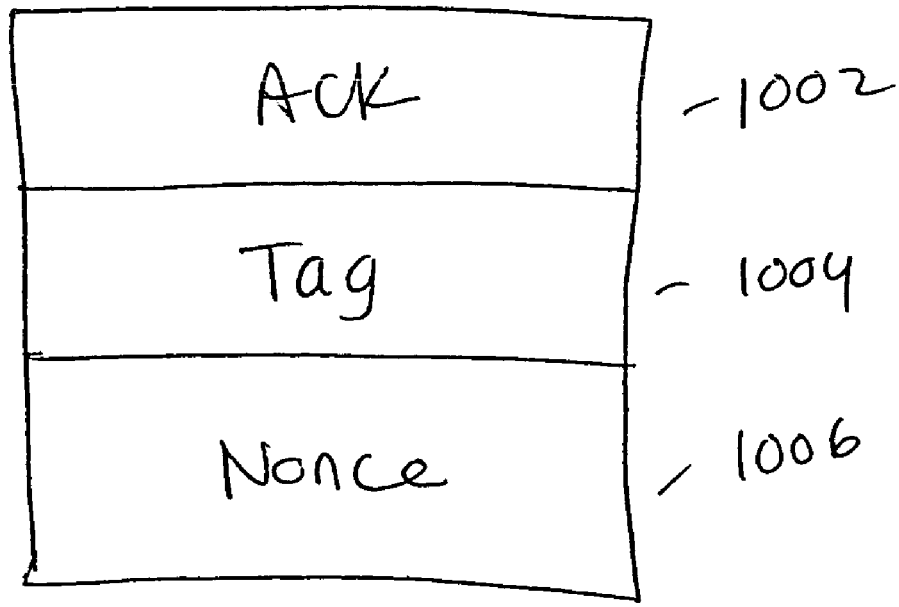
FIG. 10 is a communication message diagram showing the relevant fields of an exemplary explicit acknowledgment in accordance with an embodiment of the present invention.

FIG. 10 shows the relevant fields of an exemplary explicit acknowledgment 1000. The explicit acknowledgment 1000 includes, among other things, an acknowledgement (ACK) field 1002, a tag field 1004, and a nonce field 1006. The RP generates the explicit acknowledgment 1000 and forwards it downstream toward the host. The RP sets the tag field 1004 and the nonce field 1006 equal to the tag field 904 and nonce field 906, respectively, from the tagged PIM join message so that the intermediate PIM routers can correlate the explicit acknowledgment to the tagged PIM join message.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within the corresponding communication device (host, key server, DR, intermediate PIM router, RP) under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a communication system having a rendezvous point device that forwards multicast communication messages to members of a shared tree, a designated device in communication with the rendezvous point device via a number of intermediate devices, and a host device in communication with the designated device. The host device sends a join request to the designated device using a predetermined multicast group management protocol in order to join the shared tree for receiving the multicast communication messages forwarded by the rendezvous point device. The designated device receives the join request and forwards to the rendezvous point device via the number of intermediate devices an encoded join request generated using an authentication key associated with the host device. The rendezvous point device receives the encoded join request and authenticates the encoded join message using the authentication key associated with the host device. The host device is prevented from receiving the multicast communication messages forwarded by the rendezvous point device if the rendezvous point device determines that the encoded join request is not authentic, but is added to the shared tree if the rendezvous point device determines that the encoded join request is authentic. In the communication system, a key server may authenticate the host device, generate the authentication key for the host device, and provide the authentication key to both the host device and the rendezvous point device using a secure key distribution mechanism. The designated device obtains the authentication key, preferably from the host device included within the join request.

The present invention may also be embodied as key server logic for authenticating a host device, generating an authentication key for the host device, and sending the authentication key to the host device and to a rendezvous point device using a secure key distribution mechanism.

The present invention may also be embodied as host device logic for obtaining an authentication key and sending a join request to a designated device using a predetermined multicast group management protocol. The join request includes the authentication key. The predetermined multicast group management protocol is preferably an extended Internet Group Management Protocol (IGMP) including means for including the authentication key in the join request.

The present invention may also be embodied as DR logic for receiving a join request from a host device, generating an encoded join request using an authentication key associated with the host device, and sending the encoded join request toward a rendezvous point device. The join request preferably includes the authentication key. The DR also joins a shared tree on behalf of the host device and establishes appropriate multicast routes for forwarding multicast communication messages to the host device.

The present invention may also be embodied as intermediate device logic for receiving an encoded join request for a host device and forwarding the encoded join request toward a rendezvous point device. The intermediate device may join a shared tree and establish appropriate multicast routes for forwarding multicast communication messages toward the host device, if the intermediate device is not already joined to the shared tree, or else the intermediate device may wait for an explicit acknowledgment message from the rendezvous point device before establishing appropriate multicast routes for forwarding multicast communication messages toward the host device, if the intermediate device is already joined to the shared tree.

The present invention may also be embodied as rendezvous point device logic for receiving an encoded join request for a host device, authenticating the encoded join request to determine whether or not the encoded join request is authentic, and establishing appropriate multicast routes for forwarding multicast communication messages to the host device if and only if the encoded join request is determined to be authentic. Authenticating the encoded join request involves maintaining a number of authentication keys, determining the host device for the encoded join request, and searching for an authentication key associated with the host device. If there is no authentication key associated with the host device, then the encoded join request is considered to be not authentic. If there is an authentication key associated with the host device, then the authentication key is used to authenticate the encoded join request. The rendezvous point device may send an explicit acknowledgment if the encoded join request is determined to be authentic.

The present invention may also be embodied as a method in a communication system having a host device, a designated device, and a rendezvous point device. The method involves sending a join request by the host device to the designated device in order to join a shared tree, sending an encoded join request by the designated device to the rendezvous point device, authenticating the encoded join request by the rendezvous point device, adding the host device to the shared tree if the encoded join request is authentic, and excluding the host device from the shared tree if the encoded join request is not authentic.

The present invention may also be embodied as a communication message embodied in a data signal. The communication message may be a key distribution message including a group key for a multicast group and an authentication key for a host device. The communication message may be a join request including an authentication key for a host device. The communication message may be an encoded join request including a tag field and a nonce field.

The communication message may be an explicit acknowledgment including a tag field and a nonce field.

The present invention may be embodied in other specific forms without departing from the true scope of the invention. The described embodiments are to be considered in all respects only as illustrative and not restrictive.

I claim:

1. A communication system comprising:
    a rendezvous point device that forwards multicast communication messages to members of a shared tree and is a root of the shared tree;
    a designated device in communication with the rendezvous point device via a number of intermediate devices; and
    a host device in communication with the designated device, wherein to join the shared tree:
    the host device forwards an authentication key, uniquely generated by a key server for the host device, to the designated device;
    the host device sends a join request to the designated device using a predetermined multicast group management protocol in order to join the shared tree for receiving the multicast communication messages forwarded by the rendezvous point device, the join request including the authentication key;
    the designated device receives the join request and forwards to the rendezvous point device via the number of intermediate devices an encoded join request, wherein the encoded join request comprises a tag field computed using a keyed hashed function and the authentication key;
    the rendezvous point device receives the encoded join request and authenticates the encoded join message-by comparing the authentication key received in the tag against a stored authentication key associated with the host device; wherein
    the host device is prevented from receiving the multicast communication messages forwarded by the rendezvous point device, if the rendezvous point device determines that the encoded join message is not authentic.

2. The communication system of claim 1, wherein the key server provides the authentication key to both the host device and the rendezvous point device using a secure key distribution mechanism.

3. The communication system of claim 1, wherein the host device sends the authentication key to the designated device in the join request.

4. The communication system of claim 3, wherein the predetermined multicast group management protocol is an extended Internet Group Management Protocol (IGMP) including means for including the authentication key in the join request.

5. The communication system of claim 1, wherein the designated device joins the shared tree on behalf of the host device.

6. The communication system of claim 5, wherein the designated device establishes appropriate multicast routes for forwarding multicast communication messages to the host.

7. The communication system of claim 1, wherein each intermediate device receives the encoded join request and forwards the encoded join request toward the rendezvous point device.

8. The communication system of claim 7, wherein each intermediate device that is not already joined to the shared tree joins the shared tree on behalf of the host device and establishes appropriate multicast routes for forwarding multicast communication messages toward the host device upon receiving the encoded join request.

9. The communication system of claim 7, wherein each intermediate device that is already joined to the shared tree waits for an explicit acknowledgment message from the rendezvous point device and establishes appropriate multicast routes for forwarding multicast communication messages toward the host device only upon receiving the explicit acknowledgment message from the rendezvous point device.

10. The communication system of claim 1, wherein the rendezvous point device sends an explicit acknowledgment message toward the host device upon determining that the encoded join request is authentic.

11. A method comprising:
obtaining an authentication key uniquely associated with a host device from a key server along with a group membership key following authentication of the host device by the key server; and
sending a join request to a designated device using a predetermined multicast group management protocol, the join request including the authentication key for use by the designated device for encoding the join message prior to forwarding of the join message to a rendezvous point wherein the join message is encoded by inserting a tag field computed using a keyed hash function and the authentication key.

12. The method of claim 11, wherein the predetermined multicast group management protocol is an extended Internet Group Management Protocol (IGMP) including means for including the authentication key in the join request.

13. An apparatus comprising:
receiving logic operably coupled to receive an authentication key uniquely generated for the apparatus and to receive a group membership key from a key server following authentication of the host device by the key server; and
joining logic operably coupled to send a join request to a designated device using a predetermined multicast group management protocol, the join request including the authentication key for use by the designated device for encoding the join message prior to forwarding of the join message to a rendezvous point, to enable authentication of the join message at the rendezvous point by comparison of the authentication key associated with the apparatus against a stored key associated with the apparatus.

14. The apparatus of claim 13, wherein the predetermined multicast group management protocol is an extended Internet Group Management Protocol (IGMP) including means for including the authentication key in the join request.

15. A method of authentication a host device for access to a shared tree comprising:
receiving a join request from a host device;
generating an encoded join request using an authentication key uniquely associated with the host device, wherein the encoded join request comprises a tag field computed using a keyed hash function and the authentication key, the authentication key being received together with a group key by the host device following authentication of the host device by a key server and forwarded in the join request from the host device; and
sending the encoded join request toward a rendezvous point device at the root of the shared tree to enable authentication of the join message at the rendezvous by comparing the authentication key uniquely associated with the host device against a stored authentication key associated with the host device at the rendezvous point.

16. The method of claim 15, wherein the join request includes the authentication key.

17. The method of claim 15, further comprising:
joining a shared tree on behalf of the host device and establishing appropriate multicast routes for forwarding multicast communication messages to the host device.

18. An apparatus for securing a shared tree comprising:
receiving logic operably coupled to receive a join request from a host device;
encoding logic operably coupled to generate an encoded join request using an authentication key uniquely associated with the host device, wherein the encoded join request comprises a tag field computed using a keyed hash function and the authentication key, the authentication key being received by the host device following authentication of the host device by a key server and forwarded in the join request from the host device; and
sending logic operably coupled to send the encoded join request toward a rendezvous point device at the root of the shared tree to enable authentication of the join message at the rendezvous point by comparing the authentication key associated with the host device against a stored authentication key associated with the host at the rendezvous point.

19. The apparatus of claim 18, wherein the join request includes the authentication key.

20. The apparatus of claim 18, further comprising:
joining logic operably coupled to join a shared tree on behalf of the host device; and
routing logic operably coupled to establish appropriate multicast routes for forwarding multicast communication messages to the host device.

21. A computer readable medium having embodied therein a computer program for controlling a computer system, the computer program comprising:
receiving logic programmed to receive a join request from a host device;
encoding logic programmed to generate an encoded join request using an authentication key uniquely associated with the host device, wherein the encoded join request comprises a tag field computed using a keyed hash function and the authentication key, the authentication key being received by the host device together with a group key following authentication of the host device by a key server and forwarded in the join request from the host device; and
sending logic programmed to send the encoded join request toward a rendezvous point device to enable authentication of the join message at the rendezvous point by comparing the authentication key associated with the host device against a stored key associated with the host device at the rendezvous point.

22. The computer readable medium of claim 21, wherein the join request includes the authentication key.

23. The computer readable medium of claim 21, further comprising:
joining logic operably coupled to join a shared tree on behalf of the host device; and
routing logic operably coupled to establish appropriate multicast routes for forwarding multicast communication messages to the host device.

24. The computer readable medium of claim 21, wherein the computer readable medium is a computer storage medium.

25. The computer readable medium of claim 21, wherein the computer readable medium is a computer communication medium.

26. A method comprising:
receiving, from a designated routing device coupled to a host, an encoded join request for the host device, the encoded join request being encoded by the designated routing device using an authentication key uniquely associated with the host, wherein the encoded join request comprises a tag field computed using a keyed hash function and the authentication, the authentication key being received by the host device following authentication of the host device by a key server and forwarded in a join request forwarded from host device to the designated routing device;
authenticating the encoded join request using the host device authentication key to determine whether or not the encoded join request is authentic by comparing the authentication key against a stored authentication key uniquely associated with the host; and
establishing appropriate multicast routes for forwarding multicast communication messages to the host device if and only if the encoded join request is determined to be authentic.

27. The method of claim 26, wherein authenticating the encoded join request comprises:
maintaining a number of authentication keys uniquely associated with a corresponding number of host devices;
determining the host device for the encoded join request; and searching a storage device for an authentication key uniquely associated with the host device.

28. The method of claim 27, wherein authenticating the encoded join request further comprises:
failing to find an authentication key associated with the host device; and
determining that the encoded join request is not authentic.

29. The method of claim 27, wherein authenticating the encoded join request further comprises:
finding an authentication key associated with the host device; and authenticating the encoded join request using the authentication key associated with the host device.

30. The method of claim 26, further comprising:
sending an explicit acknowledgment toward the host device if and only if the encoded join request is determined to be authentic.

31. An apparatus comprising:
receiving logic operably coupled to receive an encoded join request for a host device, the encoded join request being encoded and forwarded by a designated routing device coupled to the host device using an authentication key uniquely associated with the host device, wherein the encoded join request comprises a tag field computed using a keyed hash function and the authentication key, the authentication key being received by the host device following authentication of the host device by a key server and forwarded in a join request forwarded from host device to the designated routing device;
authenticating logic operably coupled to authenticate the encoded join request by comparing the host device authentication key to a stored authentication key associated with the host device to determine whether or not the encoded join request is authentic; and
routing logic operably coupled to establish appropriate multicast routes for forwarding multicast communication messages to the host device if and only if the encoded join request is determined to be authentic.

32. The apparatus of claim 31, wherein the authenticating logic is operably coupled to maintain a number of authentication keys, determine the host device for the encoded join request, and search for an authentication key associated with the host device.

33. The apparatus of claim 32, wherein the authenticating logic is operably coupled to determine that the encoded join request is not authentic if the authenticating logic fails to find an authentication key associated with the host device.

34. The apparatus of claim 32, wherein the authenticating logic is operably coupled to authenticate the encoded join request using an authentication key associated with the host device if the authenticating logic finds the authentication key associated with the host device.

35. The apparatus of claim 31, further comprising:
acknowledgment logic operably coupled to send an explicit acknowledgment toward the host device if and only if the encoded join request is determined to be authentic.

36. A computer readable medium having embodied therein a computer program for controlling a computer system, the computer program comprising:
receiving logic programmed to receive an encoded join request for a host device, the encoded join request being encoded and forwarded by a designated routing device coupled to the host device using an authentication key uniquely associated with the host device, the authentication key being received by the host device together with a group key following authentication of the host device by a key server and forwarded in a join request forwarded from host device to the designated routing device;
authenticating logic programmed to authenticate the encoded join request by comparing the host device authentication key against a stored authentication key associated with the host device to determine whether or not the encoded join request is authentic; and
routing logic programmed to establish appropriate multicast routes for forwarding multicast communication messages to the host device if and only if the encoded join request is determined to be authentic.

37. The computer readable medium of claim 36, wherein the authenticating logic is programmed to maintain a number of authentication keys, determine the host device for the encoded join request, and search for an authentication key associated with the host device.

38. The computer readable medium of claim 37, wherein the authenticating logic is programmed to determine that the encoded join request is not authentic if the authenticating logic fails to find an authentication key associated with the host device.

39. The computer readable medium of claim 37, wherein the authenticating logic is programmed to authenticate the encoded join request using an authentication key associated with the host device if the authenticating logic finds the authentication key associated with the host device.

40. The computer readable medium of claim 36, further comprising:
acknowledgment logic programmed to send an explicit acknowledgment toward the host device if and only if the encoded join request is determined to be authentic.

41. The computer readable medium of claim 36, wherein the computer readable medium is a computer storage medium.

42. The computer readable medium of claim 36, wherein the computer readable medium is a computer communication medium.

43. In a communication system having a host device, a designated device, and a rendezvous point device, a method comprising:

sending a join request by the host device to the designated device in order to join a shared tree, the join request including an authentication key uniquely associated with the host device;

sending an encoded join request by the designated device to the rendezvous point device, wherein the encoded join request comprises a tag field computed using a keyed hash function and the authentication key;

authenticating the encoded join request by the rendezvous point device by comparing the host device authentication key against a stored authentication key associated with the host device;

adding the host device to the shared tree, if the encoded join request is authentic; and excluding the host device from the shared tree, if the encoded join request is not authentic.

\* \* \* \* \*